United States Patent
Tu et al.

(10) Patent No.: US 12,219,344 B2
(45) Date of Patent: Feb. 4, 2025

(54) ADAPTIVE AUDIO CENTERING FOR HEAD TRACKING IN SPATIAL AUDIO APPLICATIONS

(71) Applicant: Apple Inc., Cupertino, CA (US)

(72) Inventors: Xiaoyuan Tu, Sunnyvale, CA (US); Alexander Singh Alvarado, San Jose, CA (US)

(73) Assignee: Apple Inc., Cupertino, CA (US)

( * ) Notice: Subject to any disclaimer, the term of this patent is extended or adjusted under 35 U.S.C. 154(b) by 236 days.

(21) Appl. No.: 17/485,052

(22) Filed: Sep. 24, 2021

(65) Prior Publication Data

US 2022/0103965 A1 Mar. 31, 2022

Related U.S. Application Data

(60) Provisional application No. 63/083,846, filed on Sep. 25, 2020.

(51) Int. Cl.
*H04S 7/00* (2006.01)
*G06F 3/01* (2006.01)
(Continued)

(52) U.S. Cl.
CPC ............. *H04S 7/304* (2013.01); *G06F 3/012* (2013.01); *H04R 1/32* (2013.01); *H04R 5/02* (2013.01);
(Continued)

(58) Field of Classification Search
CPC ...................................................... G06F 3/011
(Continued)

(56) References Cited

U.S. PATENT DOCUMENTS 9,142,062 B2   9/2015  Maciocci et al.
9,459,692 B1  10/2016  Li
(Continued)

FOREIGN PATENT DOCUMENTS

CN   109146965   1/2019
CN   109644317   4/2019
CN   111149369   5/2020

OTHER PUBLICATIONS

Jolliffe et al., "Principal component analysis: a review and recent developments," Philosophical transactions of the royal society A: Mathematical, Physical and Engineering Sciences, Apr. 13, 2016, 374(2065):Feb. 2, 2015, 16 pages.
(Continued)

*Primary Examiner* — Alexander Krzystan
(74) *Attorney, Agent, or Firm* — Fish & Richardson P.C.

(57) ABSTRACT

Embodiments are disclosed for adaptive audio centering for head tracking in spatial audio applications. In an embodiment, a method comprises: obtaining first motion data from an auxiliary device communicatively coupled to a source device, the source device configured to provide spatial audio content and the auxiliary device configured to playback the spatial audio content; obtaining second motion data from one or more motion sensors of the source device; determining whether the source device and auxiliary device are in a period of mutual quiescence based on the first and second motion data; in accordance with determining that the source device and the auxiliary device are in a period of mutual quiescence, re-centering the spatial audio in a three-dimensional virtual auditory space; and rendering the 3D virtual auditory space for playback on the auxiliary device.

20 Claims, 11 Drawing Sheets

(51) Int. Cl.
*H04R 1/32* (2006.01)
*H04R 5/02* (2006.01)

(52) U.S. Cl.
CPC ....... *H04S 2400/05* (2013.01); *H04S 2420/01* (2013.01)

(58) Field of Classification Search
USPC .......................................................... 700/94
See application file for complete search history.

(56) References Cited

U.S. PATENT DOCUMENTS

| | | | |
|---|---|---|---|
| 10,169,917 B2* | 1/2019 | Chen | G06T 17/20 |
| 10,339,078 B2 | 7/2019 | Nair et al. | |
| 11,582,573 B2 | 2/2023 | Tu et al. | |
| 11,586,280 B2 | 2/2023 | Kriminger et al. | |
| 11,589,183 B2 | 2/2023 | Tu et al. | |
| 11,647,352 B2 | 5/2023 | Tam et al. | |
| 11,675,423 B2 | 6/2023 | Akgul et al. | |
| 2005/0281410 A1 | 12/2005 | Grosvenor et al. | |
| 2012/0050493 A1 | 3/2012 | Ernst et al. | |
| 2014/0153751 A1 | 6/2014 | Wells | |
| 2015/0081061 A1 | 3/2015 | Aibara et al. | |
| 2015/0193014 A1 | 7/2015 | Yamada | |
| 2015/0302720 A1 | 10/2015 | Zhang et al. | |
| 2016/0119731 A1 | 4/2016 | Lester, III | |
| 2016/0262608 A1* | 9/2016 | Krueger | G16H 40/63 |
| 2016/0269849 A1 | 9/2016 | Riggs et al. | |
| 2017/0188895 A1 | 7/2017 | Nathan | |
| 2017/0295446 A1 | 10/2017 | Thagadur Shivappa | |
| 2018/0091923 A1 | 3/2018 | Satongar et al. | |
| 2018/0125423 A1 | 5/2018 | Chang et al. | |
| 2018/0176468 A1* | 6/2018 | Wang | G09G 5/14 |
| 2018/0220253 A1 | 8/2018 | Kärkkäinen et al. | |
| 2018/0242094 A1 | 8/2018 | Baek et al. | |
| 2018/0332420 A1* | 11/2018 | Salume | H04S 7/304 |
| 2018/0343534 A1* | 11/2018 | Norris | H04S 7/303 |
| 2019/0121522 A1* | 4/2019 | Davis | G06V 40/28 |
| 2019/0166435 A1* | 5/2019 | Crow | H04R 25/43 |
| 2019/0224528 A1 | 7/2019 | Omid-Zohoor et al. | |
| 2019/0313201 A1 | 10/2019 | Torres et al. | |
| 2019/0313915 A1 | 10/2019 | Tzvieli et al. | |
| 2019/0374161 A1 | 12/2019 | Ly et al. | |
| 2019/0379995 A1 | 12/2019 | Lee et al. | |
| 2020/0037097 A1 | 1/2020 | Torres et al. | |
| 2020/0059749 A1 | 2/2020 | Casimiro Ericsson et al. | |
| 2020/0169828 A1 | 5/2020 | Liu et al. | |
| 2020/0323727 A1 | 10/2020 | Agrawal et al. | |
| 2021/0044913 A1* | 2/2021 | Häussler | G06T 13/205 |
| 2021/0064132 A1 | 3/2021 | Rubin et al. | |
| 2021/0100480 A1 | 4/2021 | Kang et al. | |
| 2021/0211825 A1 | 7/2021 | Joyner et al. | |
| 2021/0394020 A1 | 12/2021 | Killen et al. | |
| 2021/0396779 A1 | 12/2021 | Sarathy et al. | |
| 2021/0397249 A1 | 12/2021 | Kriminger et al. | |
| 2021/0397250 A1 | 12/2021 | Akgul et al. | |
| 2021/0400414 A1 | 12/2021 | Tu et al. | |
| 2021/0400418 A1 | 12/2021 | Tam et al. | |
| 2021/0400419 A1 | 12/2021 | Turgut et al. | |
| 2021/0400420 A1 | 12/2021 | Tam et al. | |
| 2022/0103964 A1 | 3/2022 | Tu et al. | |

OTHER PUBLICATIONS

Zhang et al., "Template Matching Based Motion Classification for Unsupervised Post-Stroke Rehabilitation," Paper, Presented at Proceedings of the International Symposium on Bioelectronics and Bioinformations 2011, Suzhou, China, Nov. 3-5, 2011, pp. 199-202.

* cited by examiner

ADAPTIVE AUDIO CENTERING FOR HEAD TRACKING IN SPATIAL AUDIO APPLICATIONS

CROSS-REFERENCE TO RELATED APPLICATION

This application claims priority to U.S. Provisional Patent Application No. 63/083,846, filed Sep. 25, 2020, the entire contents of which are incorporated herein by reference.

TECHNICAL FIELD

This disclosure relates generally to head tracking for spatial audio applications.

BACKGROUND

Spatial audio creates a three-dimensional (3D) virtual auditory space that allows a user wearing an auxiliary device with inertial sensors to pinpoint where a sound source is located in the 3D virtual auditory space, while watching a movie, playing a video game or interacting with augmented reality (AR) or virtual reality (VR) content on a source device (e.g., a tablet computer). Some existing spatial audio platforms include a head tracker that uses a video camera to track the head of the user and a face detector that provides a face reference frame derived from camera images. A head tracking filter uses the face reference frame to correct for drift error in the inertial sensor measurements. In some applications, however, a face reference frame is not available to the head tracking filter for various reasons, such as communication errors (e.g., dropped packets), low-lighting conditions, etc.

SUMMARY

Embodiments are disclosed for adaptive audio centering for head tracking in spatial audio applications.

In an embodiment, a method comprises: obtaining, using one or more processors, first motion data from an auxiliary device communicatively coupled to a source device, the source device configured to provide spatial audio content and the auxiliary device configured to playback the spatial audio content; obtaining, using the one or more processors, second motion data from one or more motion sensors of the source device; determining, using the one or more processors, whether the source device and auxiliary device are in a period of mutual quiescence based on the first and second motion data; in accordance with determining that the source device and the auxiliary device are in a period of mutual quiescence, re-centering the spatial audio in a three-dimensional virtual auditory space; and rendering, using the one or more processors, the 3D virtual auditory space for playback on the auxiliary device.

In an embodiment, the spatial audio is re-centered by zeroing out a correction angle at a rate determined by a size of the correction angle.

In an embodiment, the mutual quiescence is static mutual quiescence, where both the source device and the auxiliary device are static.

In an embodiment, the mutual quiescence is correlated mutual quiescence, where the first motion and the second motion are correlated.

In an embodiment, the spatial audio is re-centered when the period of mutual quiescence exceeds a threshold time.

In an embodiment, the method further comprises: during the period of mutual quiescence: accumulating, using a first timer, a mutual quiescence time; detecting, using the one or more processors, a disturbance based on the first motion data or the second motion data; responsive to the detection, accumulating, using a second timer, a disturbance time; determining, using the one or more processors, that the disturbance has ended based on the first motion data or the second motion data; subtracting, using the one or more processors, the disturbance time from the mutual quiescence time; resuming, using the one or more processors, accumulating the mutual quiescence time; determining, using the one or more processors, whether the mutual quiescence time exceeds the time threshold; and in accordance with the mutual quiescence time exceeding the time threshold, re-centering the spatial audio in the three-dimensional virtual auditory environment.

In an embodiment, the method further comprises: during the disturbance, incrementing the second timer and decrementing the first timer; and after the disturbance has ended, decrementing the second time and incrementing the first timer.

In an embodiment, the first motion data and the second motion data include acceleration data and rotation rate data, and detecting a disturbance based on the first motion data or the second motion data, further comprises: determining whether a source device maximum, low-pass filtered, acceleration data or an auxiliary device maximum, low-pass filtered, acceleration data meets a first threshold; determining whether a source device maximum acceleration data or an auxiliary device maximum acceleration data meets a second threshold; determining whether a source device maximum rotation rate or an auxiliary device maximum rotation rate meets a third threshold; determining whether a source device maximum average rotation rate or an auxiliary device maximum average rotation rate meets a fourth threshold; and in accordance with the first, second, third and fourth thresholds being met, determining that a disturbance is detected.

In an embodiment, the method further comprises: during the period of mutual quiescence: accumulating, using a first timer, a first mutual quiescence time; detecting a disturbance based on the first motion data or the second motion data; responsive to the detection, accumulating, using a second timer, a disturbance time; determining that disturbance time has exceeded a time threshold; and resetting the first timer and the second timer to zero.

In an embodiment, the method further comprises: during the period of mutual quiescence: determining that a visual anchor was used to re-center the spatial audio; and resetting the mutual quiescence time to zero.

In an embodiment, a system comprises: one or more processors; memory storing instructions that when executed by the one or more processors cause the one or more processors to perform operations comprising: obtaining first motion data from an auxiliary device communicatively coupled to a source device, the source device configured to provide spatial audio content and the auxiliary device configured to playback the spatial audio content; obtaining second motion data from one or more motion sensors of the source device; determining whether the source device and auxiliary device are in a period of mutual quiescence based on the first and second motion data; in accordance with determining that the source device and the auxiliary device are in a period of mutual quiescence, re-centering the spatial audio in a three-dimensional virtual auditory space; and rendering the 3D virtual auditory space for playback on the auxiliary device.

In an embodiment, the spatial audio is re-centered by zeroing out a correction angle at a rate determined by a size of the correction angle.

In an embodiment, the mutual quiescence is static mutual quiescence, where both the source device and the auxiliary device are static.

In an embodiment, the mutual quiescence is correlated mutual quiescence, where the first motion and the second motion are correlated.

In an embodiment, the spatial audio is re-centered when the period of mutual quiescence exceeds a threshold time.

In an embodiment, the operations further comprise: during the period of mutual quiescence: accumulating, using a first timer, a mutual quiescence time; detecting a disturbance based on the first motion data or the second motion data; responsive to the detection, accumulating, using a second timer, a disturbance time; determining that the disturbance has ended based on the first motion data or the second motion data; subtracting the disturbance time from the mutual quiescence time; resuming accumulating the mutual quiescence time; determining whether the mutual quiescence time exceeds the time threshold; and in accordance with the mutual quiescence time exceeding the time threshold, re-centering the spatial audio in the three-dimensional virtual auditory environment.

In an embodiment, the operations further comprise: during the disturbance, incrementing the second timer and decrementing the first timer; and after the disturbance has ended, decrementing the second time and incrementing the first timer.

In an embodiment, the first motion data and the second motion data include acceleration data and rotation rate data, and detecting a disturbance based on the first motion data or the second motion data, further comprises: determining whether a source device maximum, low-pass filtered, acceleration data or an auxiliary device maximum, low-pass filtered, acceleration data meets a first threshold; determining whether a source device maximum acceleration data or an auxiliary device maximum acceleration data meets a second threshold; determining whether a source device maximum rotation rate or an auxiliary device maximum rotation rate meets a third threshold; determining whether a source device maximum average rotation rate or an auxiliary device maximum average rotation rate meets a fourth threshold; and in accordance with the first, second, third and fourth thresholds being met, determining that a disturbance is detected.

In an embodiment, the operations further comprise: during the period of mutual quiescence: accumulating, using a first timer, a first mutual quiescence time; detecting a disturbance based on the first motion data or the second motion data; responsive to the detection, accumulating, using a second timer, a disturbance time; determining that disturbance time has exceeded a time threshold; and resetting the first timer and the second timer to zero.

In an embodiment, the operations further comprise: during the period of mutual quiescence: determining that a visual anchor was used to re-center the spatial audio; and resetting the mutual quiescence time to zero.

Other embodiments can include an apparatus, computing device and non-transitory, computer-readable storage medium.

Particular embodiments disclosed herein provide one or more of the following advantages. Tracking error that accumulates over time is corrected by opportunistic re-centering of the spatial audio during periods of static or correlated mutual quiescence when the user and source device are static (not moving) or have persistent correlated motion, such as occurs when the user is viewing content presented by the source device while sitting in a moving vehicle, walking with the source device in hand or exercising on a treadmill. The intuition behind opportunistic re-centering after a period of quiescence is that, it is highly probable that, when both devices are relatively quiescent to each other over a period of time, the user is focused and is looking at the source device's screen straight on.

The re-centering is implemented using a bleed-to-zero (BTZ) process triggered after detecting uninterrupted period of static or correlated mutual quiescence. The rate and at BTZ re-centers the spatial audio adapts with the size of the boresight correction angle, such that smaller correction angles are corrected more slowly than larger correction angles to avoid disorientating the user. In some scenarios, the user may rotate their head to look off to the side (not at the screen) temporarily. For such a short quiescence period, BTZ is not performed because the spatial audio would be perceived by the user as off-center. Another advantage is that BTZ is exited based on a number of conditions (e.g., instantaneous head rotation rate in yaw) on head turn immediately so the tracking feels responsive to the user.

The details of one or more implementations of the subject matter are set forth in the accompanying drawings and the description below. Other features, aspects and advantages of the subject matter will become apparent from the description, the drawings and the claims.

DETAILED DESCRIPTION

Example Systems

Figure 1A:
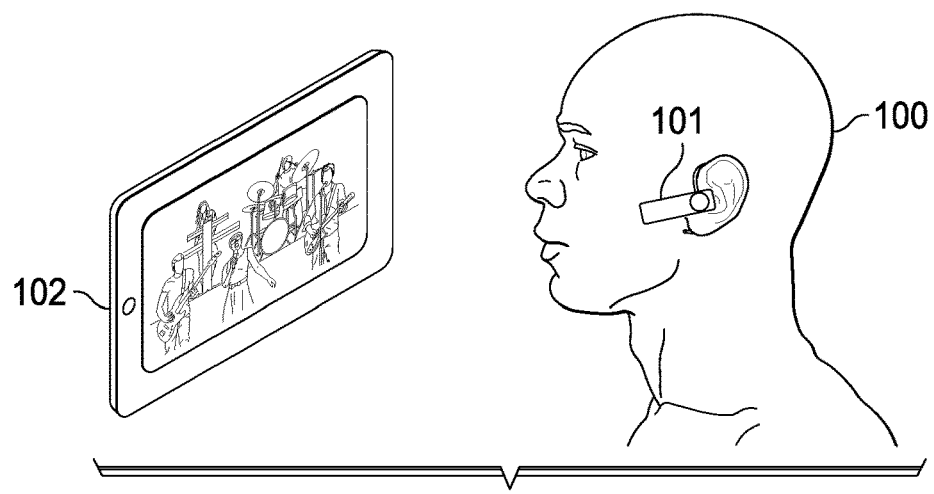
FIG. 1A illustrates a system for implementing a spatial audio application, according to an embodiment.

FIG. 1A illustrates a system for implementing a spatial audio application, according to an embodiment. In the example scenario shown, user 100 is wearing auxiliary device 101 while watching audio/visual (A/V) content displayed on a screen of source device 102. A/V content can include but is not limited to: movies, television shows, video conference calls, video games, augmented reality (AR) applications, virtual reality (VR) applications and any other content that utilizes spatial or immersive audio. Auxiliary device 101 includes any type of audio output device that is worn by the user, including on-ear, in-ear and over-ear headphones, earbuds, earphones, Airpods®, VR or AR headsets, smart glasses, and any other audio output device that is capable of producing spatial audio. In the description that follows, the auxiliary device 101 will hereinafter be referred to as headset 101. That term is used for convenience and should not be construed as limiting the types of auxiliary devices that are applicable to the embodiments disclosed herein.

Source device 102 is any device capable of presenting any type of A/V content or only spatial audio content, including but not limited to: a smartphone, tablet computer, notebook computer, wearable computer, table computer, surface tablet, etc. A spatial audio application is an application that runs on source device 102 and generates surround sound or 3D audio through headset 101. Spatial Audio is any audio which generates a 3D virtual auditory space that gives a listener a sense of space beyond conventional stereo, allowing the listener to pinpoint where sound is coming from, whether above, below, or a full 360 degrees around the listener. Spatial audio as used herein includes any channel-based, binaural or object-based audio technology, protocol, standard or format, including but not limited to: surround sound, Ambisonics, 3D audio, binaural audio, immersive audio, wave field synthesis, 360 audio, game audio and any other audio rendering technology, protocol or format that provides a 3D virtual auditory space.

Figure 1B:
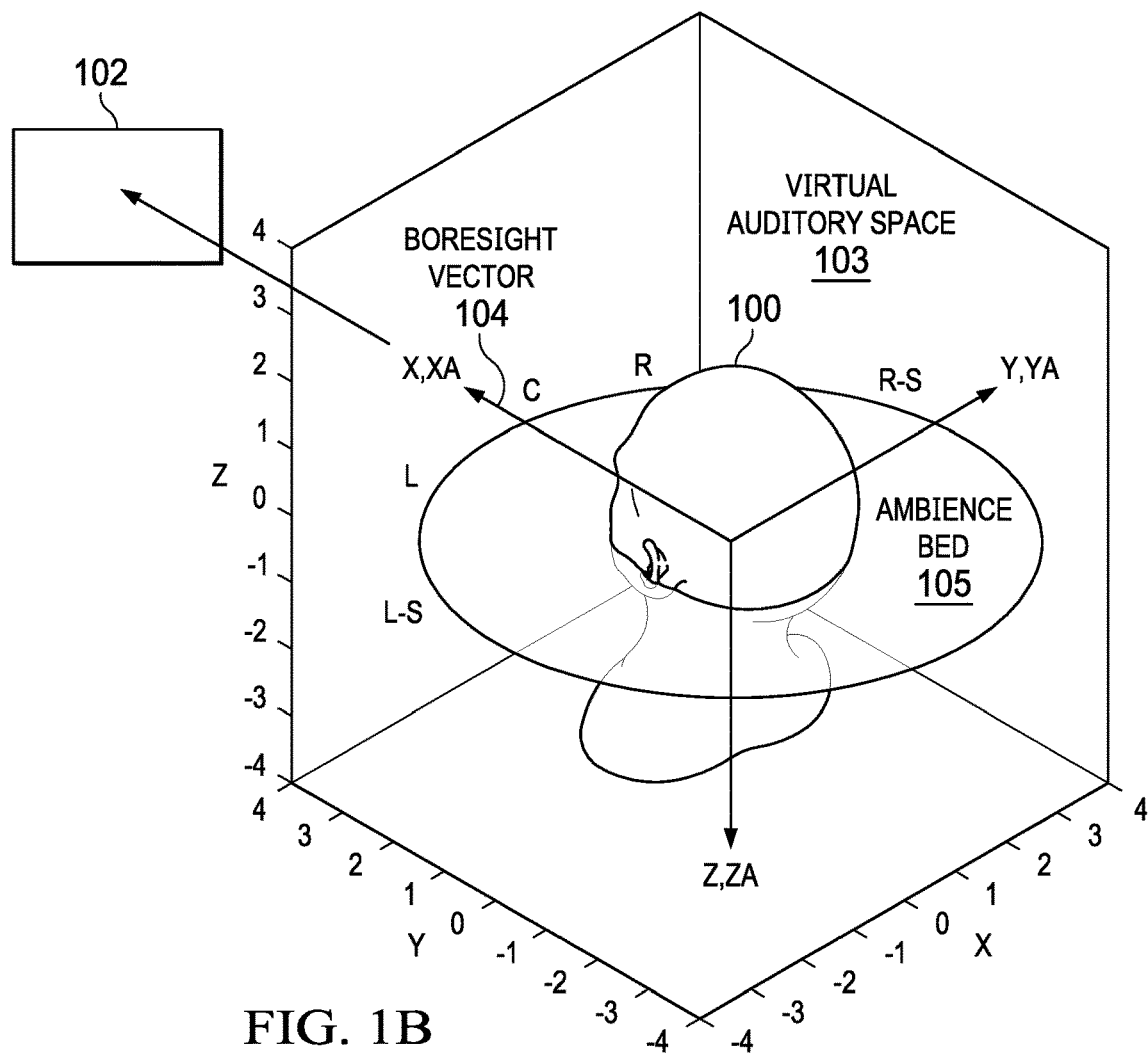
FIG. 1B illustrates a centered 3D virtual auditory space, according to an embodiment.

FIG. 1B illustrates a centered 3D virtual auditory space 103, according to an embodiment. The 3D virtual auditory space 103 includes virtual sound sources or "virtual speakers" (e.g., center (C), Left (L), Right (R), left-surround (L-S) and right-surround (R-S)) that are rendered in ambience bed 105 using known spatial audio techniques, such as binaural rendering. Note that the example ambience bed 105 is for a 5.1 audio format, where all audio channels are located in an $X_A Y_A$ plane of ambience bed 105 ($Z_A=0$), where $X_A$ is forward towards the center channel (C), $Y_A$ is right and $Z_A$ is down, following the "right-hand" rule. Other embodiments, can have more or fewer audio channels, and the audio channels can be placed at different locations in the 3D virtual auditory space arbitrarily in any plane.

To maintain the desired 3D spatial audio effect, it is desired that the center channel (C) be aligned with a boresight vector 104. The boresight vector 104 originates from a headset reference frame and terminates at a source device reference frame. When the virtual auditory environment 103 is first initialized, the center channel (C) is aligned with boresight vector 104 by rotating a reference frame for the ambience bed 105 ($X_A$, $Y_A$, $Z_A$) to align the center channel (C) with boresight vector 104, as shown in FIG. 1B. This alignment process causes the spatial audio to be "centered." When the spatial audio is centered, the user perceives audio from the center channel (e.g., spoken dialogue) as coming directly from the display of source device 102.

Figure 1C:
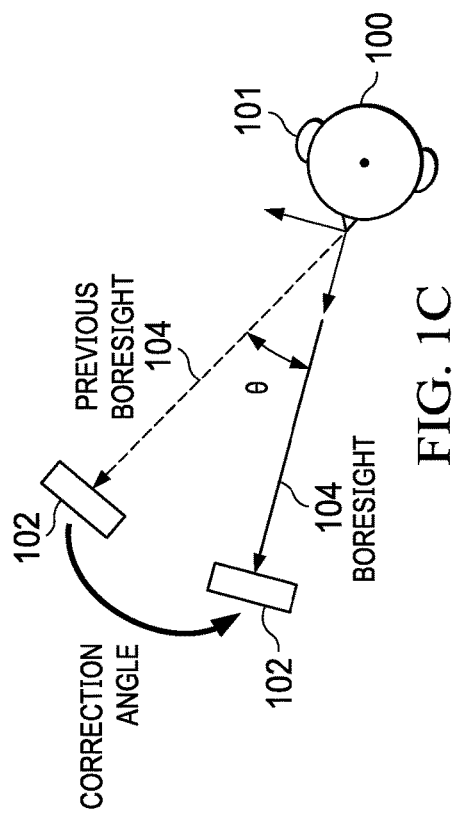
FIG. 1C illustrates boresight correction using bleed-to-zero (BTZ), according to an embodiment.

In an embodiment, the centering is accomplished by tracking boresight vector 104 to the location of source device 102 from the head reference frame using a tracking algorithm, such as an Extended Kalman Filter (EKF) which provides an estimate of boresight 104 that requires periodic correction. In an embodiment, boresight vector 104 determines the location of the center channel (C), and a second tracker takes as input the boresight vector 104 and provides an output orientation of ambience bed 105, which determines the location of the L/L-S and R/R-S surround channels around the user in addition to the center channel (C). Aligning the center channel (C) of ambience bed 105 with boresight vector 104 allows rendering of the center channel (C) at the estimated location of source device 102 for the user's audio perception. If boresight vector 104 is not centered on source device 102 when the user is looking at the screen of source device 102 straight on (e.g., due to tracking error), then aligning the center channel (C) of ambience bed 105 will not "center" the audio, since the center channel will still be rendered at the erroneous estimate of the location of source device 102. Note that boresight vector 104 changes whenever the user's head rotates with respect to source device 102, such as when source device 102 is stationary in front of the user and the user's head is rotating. In this case, the motion of the user's head is accurately tracked as the head rotates, so that even when boresight vector 104 changes, the audio stays centered on the estimated location of source device 102 because the head tracker is providing accurate tracking of how the true boresight vector 104 is changing over time. To track the head relative to source device 102, the IMU sensor data is integrated, which can introduce drift over time due to sensor errors (e.g., bias, scale factor error, etc.). It is desirable to take any good opportunity to correct such accumulated tracking errors using the BTZ process described in reference to FIGS. 2-4. FIG. 1C illustrates boresight correction using bleed-to-zero (BTZ), according to an embodiment. Due to tracking error, boresight 104 becomes uncentered from screen of source device 102, resulting in a correction angle θ that needs to zeroed out using BTZ, as described in reference to FIG. 2.

Static Correlated Mutual Quiescence and BTZ

Figure 2:
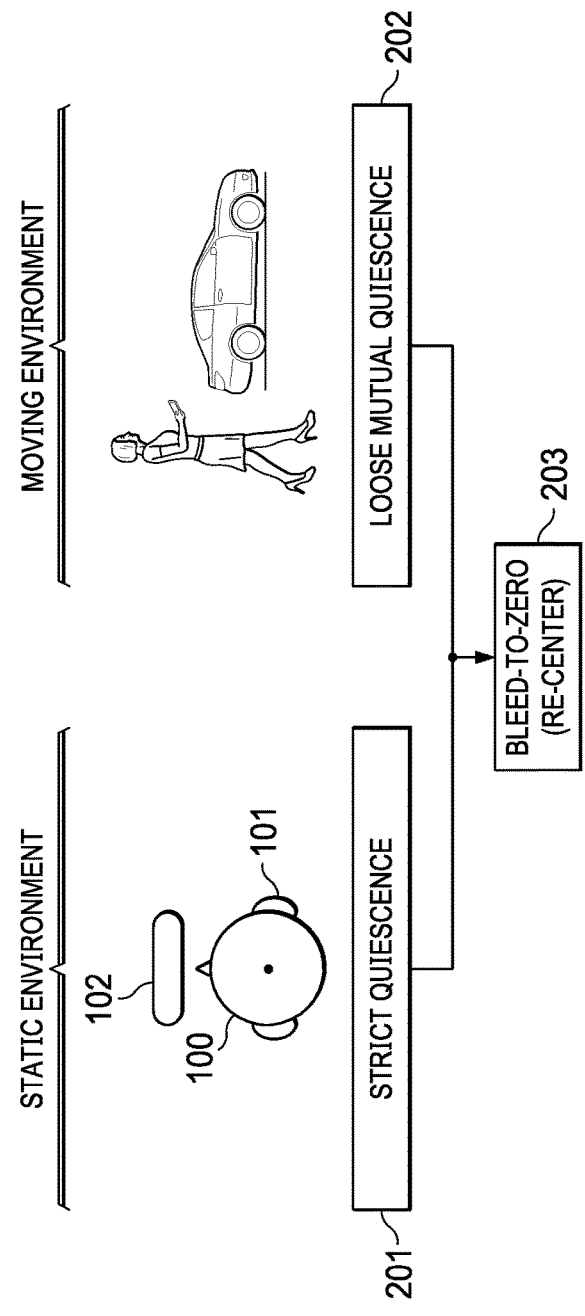
FIG. 2 is a flow diagram of a process for audio re-centering based on mutual quiescence, according to an embodiment.

FIG. 2 is a flow diagram of process 200 for audio re-centering based on mutual quiescence, according to an embodiment. There are two types of mutual quiescence that are monitored by process 200: strict or static mutual quiescence and loose or correlated mutual quiescence. Strict/static mutual quiescence is when both source device 102 and headset 101 are static, as determined by source device inertial measurement unit (IMU) 1007 and headset IMU 1111. In an embodiment, IMU 1007 includes a 3-axis MEMS accelerometer and a 3-axis MEMS gyroscope, which measure 3D accelerations and 3D rotation rates, respectively, in a source device body frame. Similarly, IMU 1111 includes a 3-axis MEMS accelerometer and a 3-axis MEMS gyroscope, which measure 3D accelerations and 3D rotation rates, respectively, in a headset body frame. Source device 102 and headset 101 each have a wireless transceiver (e.g., Bluetooth chipset) that allow bi-directional communication of sensor data and other data. The sharing of sensor data allows for relative motion tracking of boresight vector 104 by source device 102 and/or headset 101 using a head tracking filter.

Loose/correlated mutual quiescence is detected by process 200 when correlated motion between source device 102 and headset 101 is detected. Correlated motion is detected when source device 102 and headset move together (e.g., rotate or translate) relative to a global inertial reference frame. For example, correlated motion occurs when user 100 is viewing content on source device 102 while walking with source device 102 in hand, riding, flying in an airplane, walking on a treadmill, etc. For example, if user 100 is viewing content on a screen of source device 102 while riding in a car and the car makes a left or right turn, both source device IMU 1007 and headset IMU 1111 will sense that rotation. A correlated motion detector in source device 102 and/or headset 101 compares the two rotation motions (e.g., compares rotation rates and accelerations) and uses logic to determine correlated motion. When strict/static or loose/correlated mutual quiescence is detected by process 200, process 200 assumes that user is consuming content on source device 102, and the spatial audio is re-centered to correct the tracking error, as described in reference to FIG. 1B.

Figure 3:
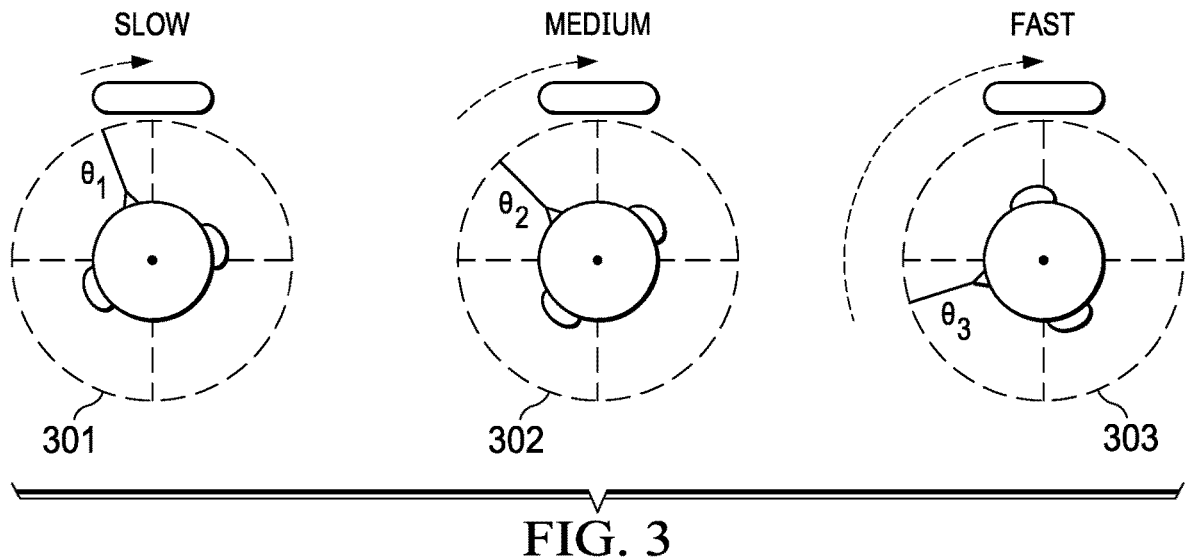
FIG. 3 illustrates the use of different audio re-centering rates for different size correction angles, according to an embodiment.

FIG. 3 illustrates the use of different audio re-centering rates for different size correction angles, according to an embodiment. The re-centering of spatial audio (also referred to herein as bleed-to-zero (BTZ)), removes a boresight correction angle adaptively based on the size of the correction angle. For a small correction angle $\theta_1$, a slow re-centering rate is applied. For a large correction angle $\theta_3$, a fast re-centering rate is applied. For a correction angle $\theta_2$ between the small correction angle $\theta_2$ and the large correction angle $\theta_3$, a medium re-centering rate is applied. The correction angles ($\theta_1$, $\theta_2$, $\theta_3$) can be computed by taking a dot product of boresight vector 104 and a reference direction vector (XA) determined during initialization when boresight vector 104 is aligned with the center channel (C) of ambience bed 105, as described in reference to FIG. 1B. The correction angles ($\theta_1$, $\theta_2$, $\theta_3$) are compared to specified threshold angles ($\theta_{th1}$, $\theta_{th2}$, $\theta_{th3}$) to determine the rate of re-centering.

Figure 4:
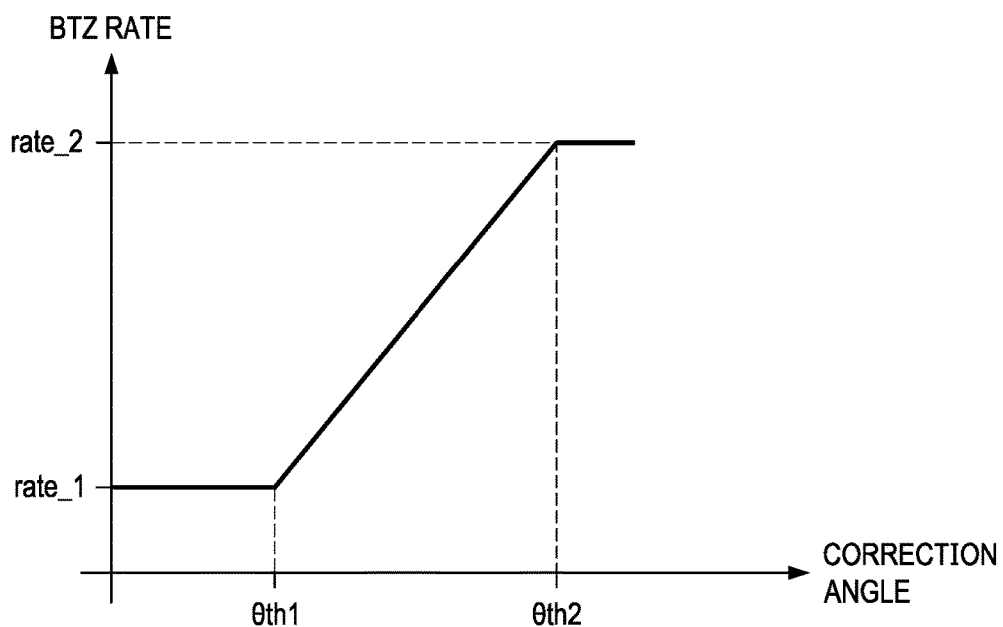
FIG. 4 is a plot of audio re-centering rate versus correction angle, according to an embodiment.

FIG. 4 is a plot of BTZ rate versus correction angle, according to an embodiment. As shown in this example, a minimum rate (rate_1) is used to re-center boresight correction angles below a first angle threshold, $\theta_{th1}$, and a maximum rate (rate 2) is used to re-center boresight correction angles greater than a second threshold angle, $\theta_{th2}$. Boresight correction angles between the first and second thresholds are re-centered at a rate determined by a linear function, as shown in FIG. 4. In other embodiments, a different rate curve can be used (e.g., quadratic).

Figure 5:
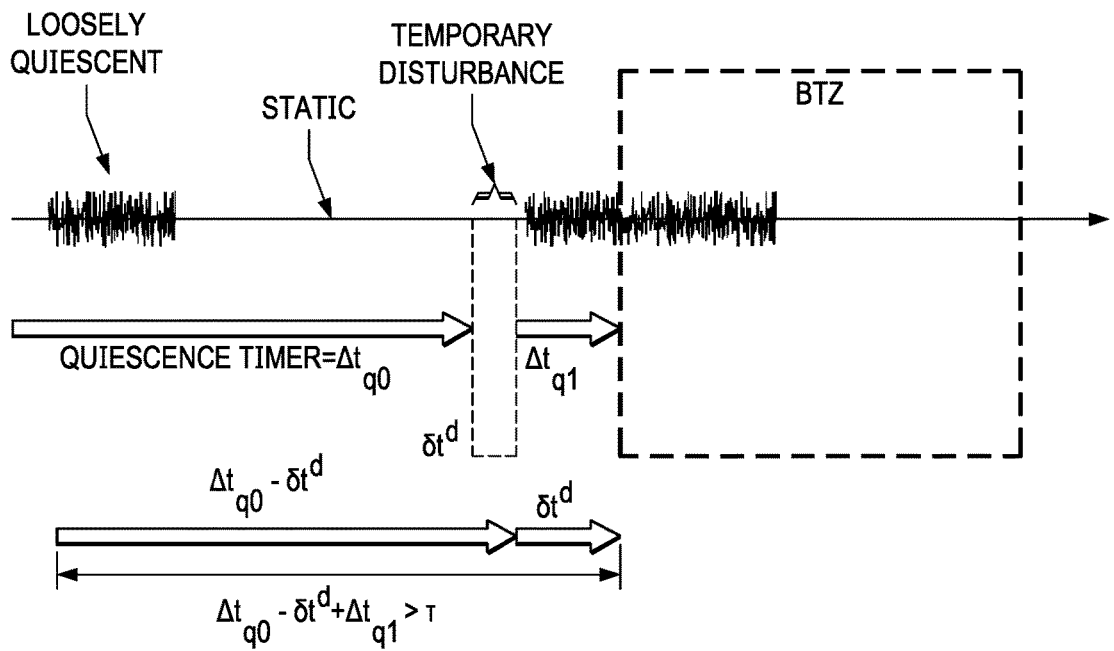
FIG. 5 illustrates tracking static/correlated mutual quiescence and temporary disturbances using timers, according to an embodiment.

FIG. 5 illustrates tracking mutual quiescence using timers, according to an embodiment. To track static and correlated mutual quiescence, three quiescence timers are used: a static mutual quiescence timer, a correlated mutual quiescence timer and a disturbance timer. It is desired to accumulate quiescent time using the static or correlated mutual quiescence timers and also allow for temporary disturbances such that the onset of BTZ is not terminated. The timers are configured so that as the static or correlated mutual quiescence timers increment the disturbance timer decrements. The timers are used to determine when a BTZ horizon time is reached to invoke the BTZ process to re-center the spatial audio in the 3D virtual auditory space.

When static or correlated mutual quiescence is detected the static mutual quiescence timer or the correlated mutual quiescence timer begin to accumulate time. Assuming correlated mutual quiescence (used when correlated motion is detected), if no disturbance is detected, the correlated mutual quiescence timer continues to accumulate time until a threshold time $\tau$ (BTZ horizon time) is exceeded at which time BTZ is invoked. If after a first period of correlated mutual quiescence ($\Delta t_{q0}$), a temporary disturbance is detected, then the disturbance timer begins to accumulate disturbance time for the duration of the temporary disturbance ($\delta_t^d$) and the correlated mutual quiescence timer is stopped but not reset. If the temporary disturbance ends before a threshold disturbance time ($\tau_0$), the accumulated disturbance time ($\delta_t^d$) is subtracted from the first period of mutual quiescence time ($\Delta t_{q0} - \delta_t^d$), the disturbance timer is set to zero and a second period of mutual quiescence time ($\Delta t_{q1}$) starts until a total accumulated mutual quiescence time ($\Delta t_{q0} - \delta_t^d + \Delta t_{q1}$) exceeds the threshold time (i), after which time the BTZ process is invoked.

Figure 6:
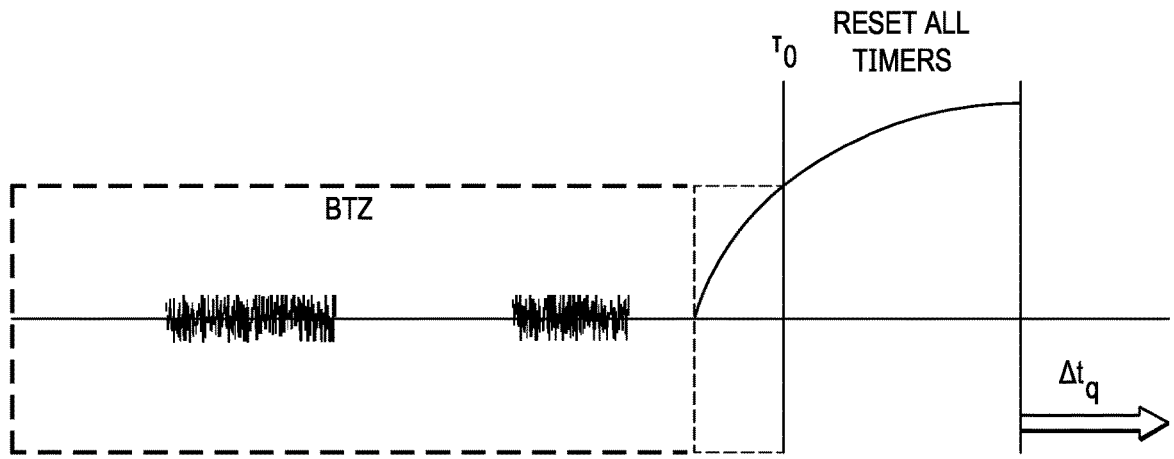
FIG. 6 illustrates resetting of timers, according to an embodiment.

Once the boresight is moved to the center position during the BTZ process, the boresight is kept at the center position as long as mutual quiescence continues. If the disturbance lasts longer than a threshold time ($\tau_0$) during the mutual quiescence period, the mutual quiescence and disturbance timers are both reset to zero (which aborts the BTZ process), as illustrated in FIG. 6. The static mutual quiescence timer can operate in a similar manner as the mutual quiescence timer described above. In an embodiment, the time threshold for triggering BTZ based on static mutual quiescence is less than the time threshold for triggering BTZ based correlated mutual quiescence.

Figure 7A:
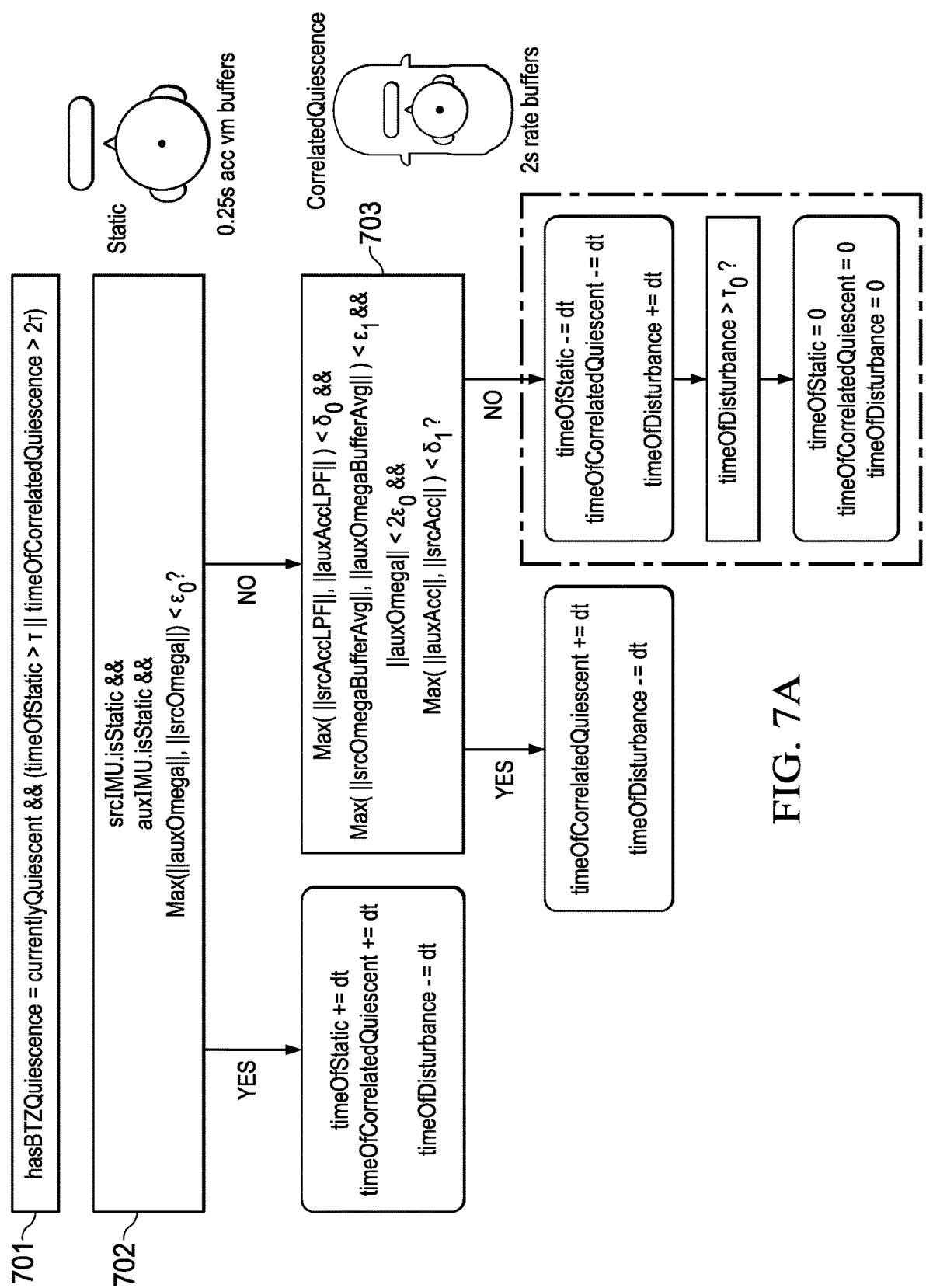
FIG. 7A illustrates logic for triggering audio re-centering based on static and correlated mutual quiescence, according to an embodiment.

FIG. 7A illustrates logic for triggering BTZ based on static or correlated mutual quiescence, according to an embodiment. The logic can be implemented using one or both of the architectures described in reference to FIGS. 10 and 11. The logic described below can be performed on each sample of sensor data or on multiple samples (e.g., windows of samples).

In an embodiment, a first logic 701 is evaluated to determine whether to invoke the BTZ process to re-center the spatial audio: hasBTZQuiescence=currentlyQuisescent && (timeOfStatic>τ||timeOfCorrelatedQuiescence>2τ). The value "hasBTZQuiescence" can be a Boolean value that is TRUE if the subsequent conditions are met and is otherwise FALSE. The variable "currentlyQuiescent" can be a Boolean value that is TRUE if mutual quiescence is currently detected. The variable "timeOfStatic" is a static quiescence timer value and "timeOfCorrelatedQuiescence" is a correlated quiescence timer value, as described in reference to FIG. 5. When there is current mutual quiescence AND either a static quiescence time OR a correlated quiescence time exceeds its respective threshold value, the BTZ process is invoked. Otherwise, "hasBTZQuiescence" is FALSE and the BTZ process is not invoked.

During a mutual quiescence period, as second logic 702 is evaluated to determine if the current mutual quiescence is static or correlated (e.g., correlated motion). In an embodiment, this determination is made using a buffer of sensor data samples, such as N seconds (e.g., N=0.25 s) of buffered acceleration samples. An example of second logic 702 is: srcIMU.isStatic && auxIMU.iStatic && Max(‖auxOmega‖, ‖srcOmega‖)>$\varepsilon_0$, where "srcIMU.isStatic" can be a Boolean value indicating that the source device is static and "auxIMU.iStatic" can be a Boolean value indicating that the headset is static, ‖auxOmega‖ is the magnitude of the 3D rotation rate vector from the Headset IMU 1111 and ‖srcOmega‖ is the magnitude of the 3D rotation rate vector from the source device IMU 1007. Second logic 702 can be verbalized as follows. When source device IMU 1007 indicates that source device 102 is static AND the Headset IMU 1111 indicates that headset 101 is static AND the greater of the maximum source device rotation rate magnitude or the maximum headset device rotation rate magnitude is less than a threshold rotation rate, then static mutual quiescence is detected. When static mutual quiescence is detected, a static quiescence timer "timeOfStatic" is incremented, a correlated mutual quiescence timer "timeOfCorrelatedQuiescent" is incremented and a disturbance timer "timeOfDisturbance" is decremented. Otherwise, third logic 703 is evaluated.

In an embodiment, third logic 703 is evaluated to determine if a temporary disturbance is present: Max(‖srcAccLPF‖, ‖auxAccLPF‖)<$\delta_0$ && Max(‖srcOmegaBufferAvg‖, ‖auxOmegaBufferAvg‖)<$\varepsilon_1$ && Max(‖auxOmega‖)<$2\varepsilon_0$ && Max(‖auxAcc‖, ‖srcAcc‖)<$\delta_1$, where "srcAccLPF is low-pass filtered acceleration vector from the source device IMU 1007, "auxAccLPF" is low-pass filtered acceleration vector from the headset IMU 1111, "srcOmegaBufferAvg" is the average of a number of buffered rotation rate samples from the source device IMU 1007, "auxOmegaBufferAvg" is the average of a number of buffered rotation rate samples (e.g., 2 s of rotation rate samples) from the headset IN/U 1111, "srcOmega" is the current rotation rate vector from the source device IMU 1007, "auxOmega" is the current rotation rate vector from the headset IMU 1111, "srcAcc" is the current acceleration vector from the source device IMU 1007 and "auxAcc" is the current acceleration vector from the headset IMU 1111.

If logic 703 is TRUE, a temporary disturbance is not detected and the timeOfCorrelatedQuiescent timer is incremented and the timeOfDisturbance timer is decremented. Otherwise, if logic 703 is FALSE, a temporary disturbance is detected, the timeOfStatic timer is decremented, the timeOfCorrelatedQuiescent timer is decremented and the timeOfDisturbence is incremented, as previously described in reference to FIG. 5. If timeOfDisturbance exceeds a maximum threshold, $\tau_0$, then timeOfStatic=0, timeOfCorrelatedQuiescent=0 and timeOfDisturbance=0. The logic described above allows for temporary disturbances and loosens quiescence bounds when there is accumulated historical quiescence and absence of BTZ.

Figure 7B:
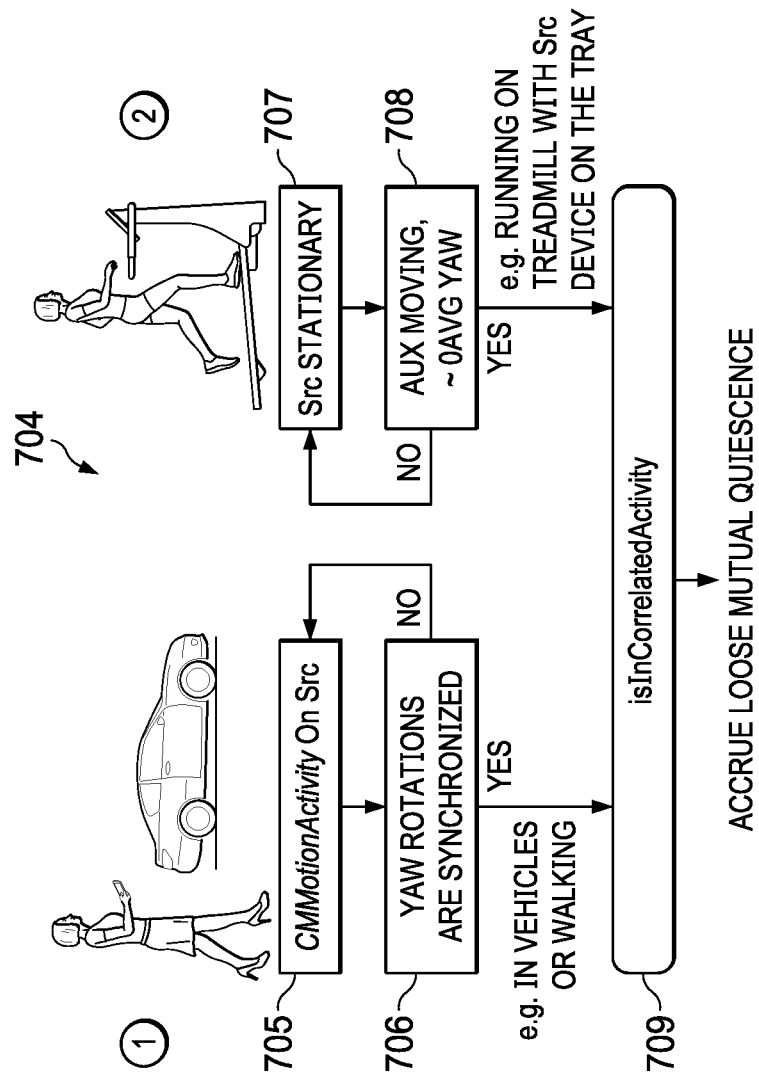
FIG. 7B illustrates correlated-activity mutual quiescence, according to an embodiment.

FIG. 7B illustrates correlated-activity mutual quiescence 704, according to an embodiment. In an embodiment, mutual quiescence is also detected when source device 102 and auxiliary device 101 are in a correlated activity state, such as, for example, during walking, in a vehicle or on treadmill. As used herein, "correlated," means that source device 102 and auxiliary device 101 are aligned in yaw rotation only, and the up and down bounces in the sensor data from walking or riding in vehicle are ignored, because these noises should not affect how the boresight is estimated. To isolate rotations in yaw, the rotations are projected into the inertial gravity directions obtained from the attitude estimators on the respective source device and auxiliary devices, using the inertial gravity estimates previously described.

In an embodiment, there are two processing paths (paths 1 and 2) used to detect correlated activity. In path 1, an activity classifier 705 that runs on source device 102 (CM-MotionActivity) is used to detect an activity type (e.g., walking, driving) If the output of the activity classifier indicates the detection of long-term moving activities like walking or vehicular activities, yaw correlation is checked 706. If yaw rotations are correlated 706, the system enters a correlated activity state 709 and the isInCorrelatedActivity=TRUE. Otherwise, isInCorrelatedActivity=FALSE.

Path 2 is a special case of correlated activity for viewing content on source device 102 while working out on a treadmill or other gym machine (e.g., elliptical, rowing machine). The system assumes that source device 102 is stationary 707 on a tray of the workout machine. When the system detects that the user is constantly moving but not rotating in yaw 708, the system enters a correlated activity state 709. Not rotating in yaw is generally true for gym machine activities, such as a treadmill, elliptical or rowing machine. When using these types of gym machines, the user's head motion is mostly pitching and but little yawing. Once the system detects that source device 102 and auxiliary device 101 are in correlated activity, loose mutual quiescence is accumulated for BTZ.

Figure 7C:
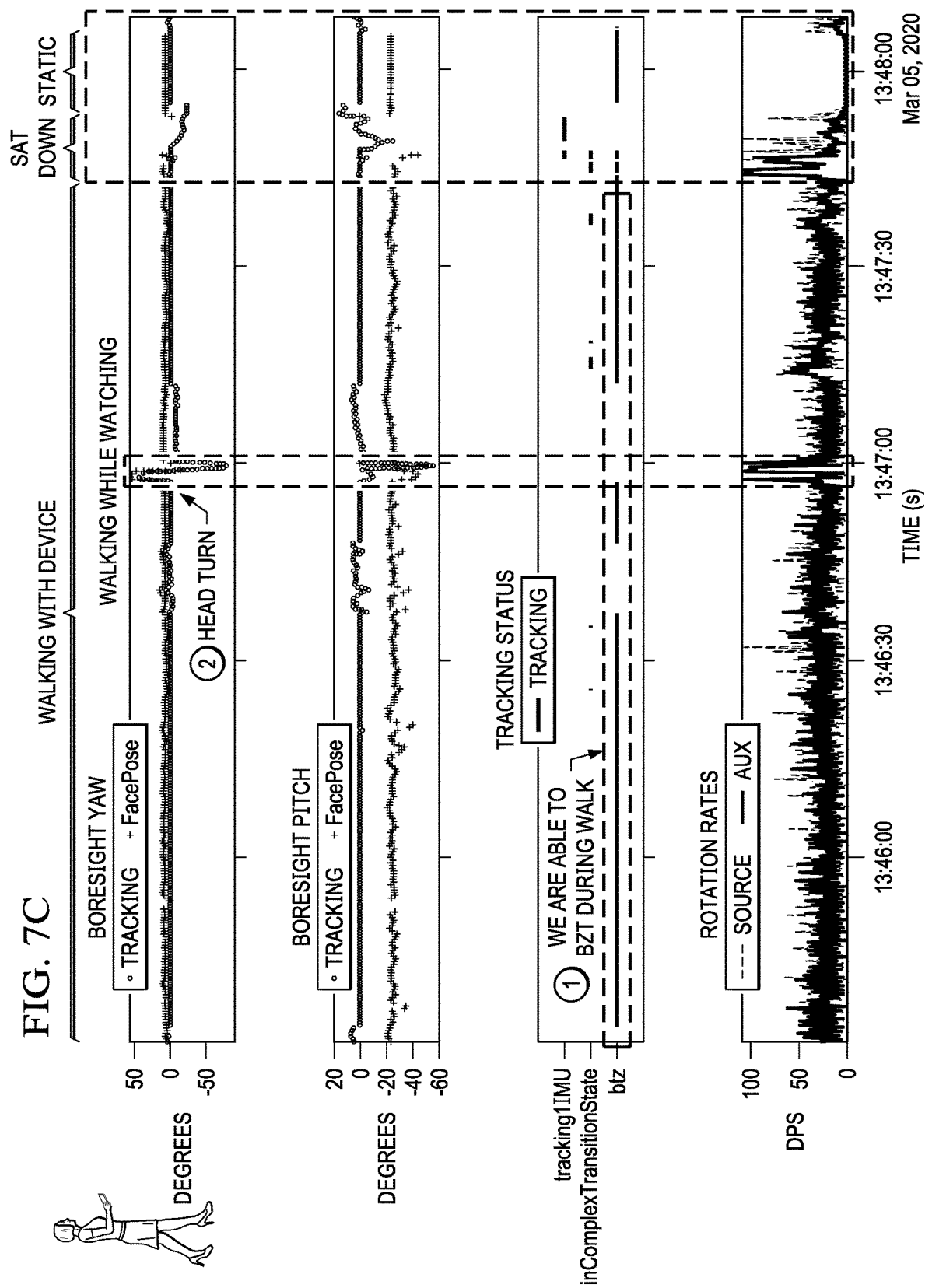
FIG. 7C is a timeline illustrating an example scenario where the user is walking with her source device in hand, according to an embodiment.

FIG. 7C is a multi-panel timeline illustrating an example scenario where the user is walking while viewing content from her source device in hand, according to an embodiment. The first panel shows boresight yaw, the second panel shows boresight pitch. The lines 710, 711 are truth data and the lines 712, 713 are estimated boresight yaw and pitch angles. The third panel shows tracking status: tracking1IMU is single IMU tracking mode, where just headset IMU 1111 is used in tracking. Also shown is complex transition states and BTZ events. The fourth panel shows the magnitude of rotation rates on source device 102 and auxiliary device 101. The rotation rates provides a sense of how much motion there is on both devices while user 100 is walking. Note that the BTZ process was triggered multiple times during walking, despite the noisy bounces in the sensor data due to the walking. Also when user 100 turns her head, the BTZ process exits immediately to capture the head turn so tracking is perceived as responsive by user 100.

Figure 8:
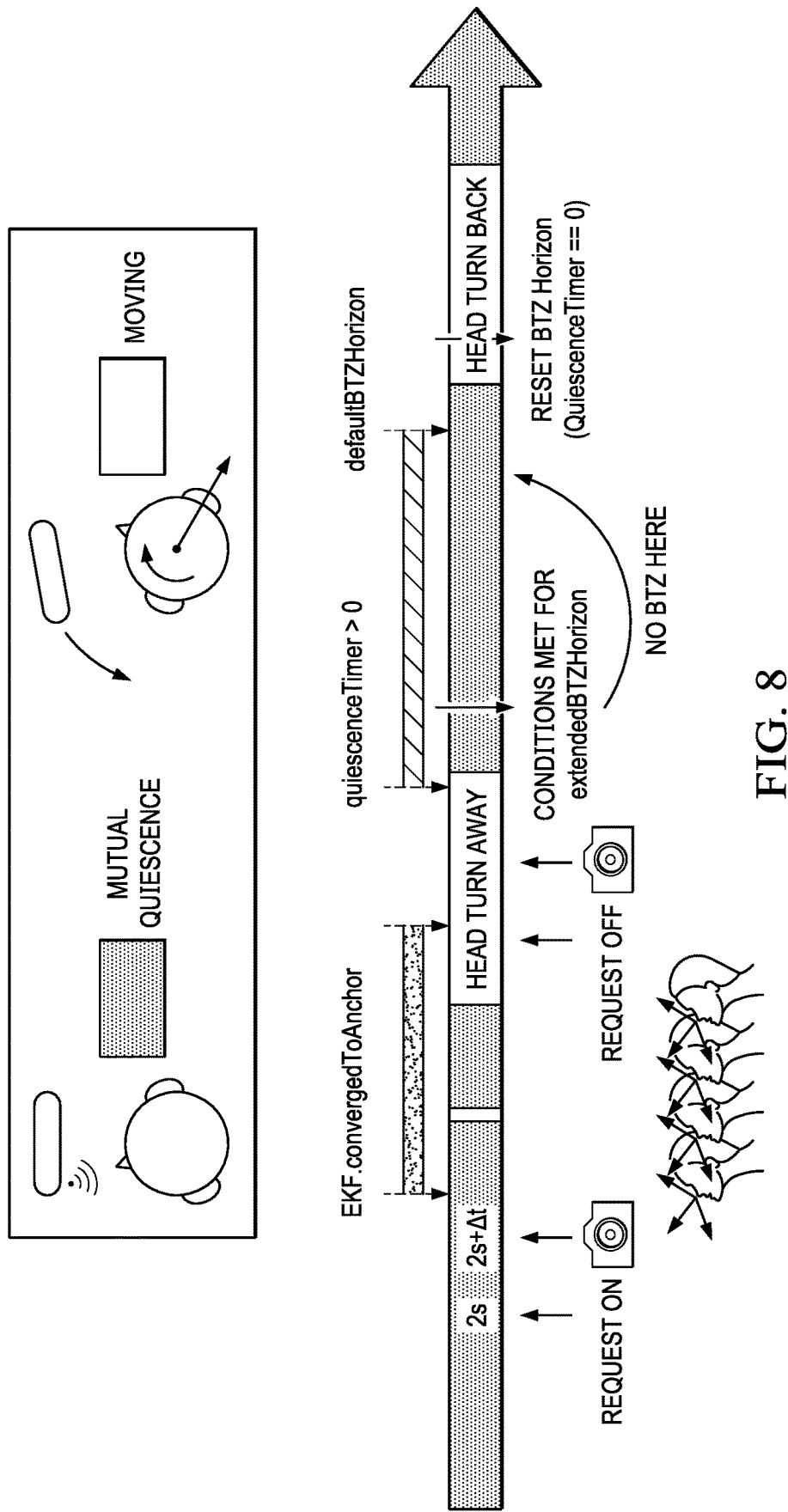
FIG. 8 illustrates extending a BTZ time horizon, according to an embodiment.

FIG. 8 illustrates extending a timeline for BTZ based on mutual quiescence, according to an embodiment. In some embodiments, the BTZ time horizon is extended, i.e., the time that elapses before the BTZ process is invoked. During a period of static or correlated mutual quiescence, a request is made by a head tracking filter to a face detector of a camera subsystem of source device 102 for a visual anchor, such as the face coordinates of user 100 in a camera frame. For example, if the head tracking filter is an extended Kalman filter (EKF) the visual anchor can be used as an observation in an update phase of the EKF. If the user turns her head away from the camera, the updates will no longer be available and the EKF will converge. If the user's head is turned away for an extended period of time and the static or correlated mutual quiescence timer is greater than zero (i.e., in a current mutual quiescence period), the conditions for extending the BTZ horizon are met.

Figure 9:
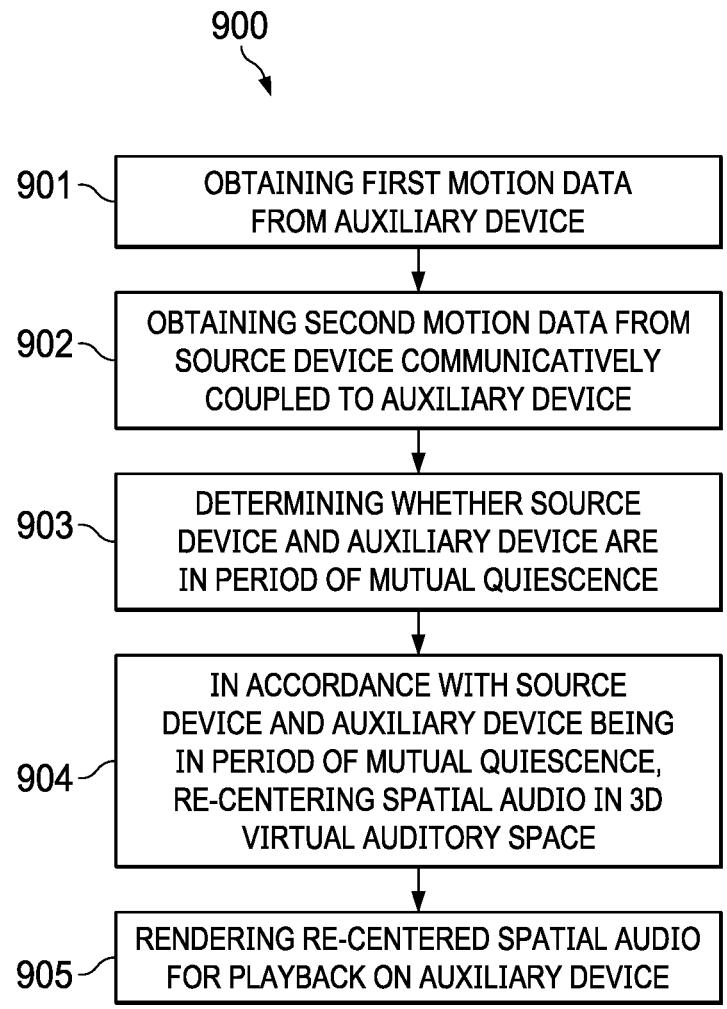
FIG. 9 is a flow diagram of a process for audio re-centering based on static/correlated mutual quiescence in a spatial audio application, according to an embodiment.

FIG. 9 is a flow diagram of a process 900 for audio re-centering based on a static or correlated mutual quiescence in a spatial audio application, according to an embodiment. Process 900 can be implemented using one or both of the architectures described in reference to FIGS. 10 and 11.

Process 900 begins by obtaining first motion data from an auxiliary device communicatively coupled to a source device (901), and obtaining second motion data from one or more motion sensors of the source device (902). The source device is configured to provide spatial audio content and the auxiliary device is configured to playback the spatial audio content. In an embodiment, the motion data includes 3D acceleration data obtained from a 3-axis MEMS accelerometers of the source device and auxiliary device and 3D rotation rate data obtained from 3-axis MEMS gyros of the source device and auxiliary device.

Process 900 continues by determining whether the source device and auxiliary device are in a period of mutual quiescence based on the first and second motion data (903), and in accordance with determining that the source device and the auxiliary device are in a period of mutual quiescence, re-centering the spatial audio in a three-dimensional virtual auditory space (904).

Process 900 continues by rendering (e.g., using binaural rendering) the 3D virtual auditory space for playback on the auxiliary device (905). In an embodiment, logic is used to determine a period of static or correlated mutual acquiescence, and timers are used to track the periods of mutual quiescence and also temporary disturbances, as described in reference to FIGS. 5-7. Mutual quiescent time is accumulated using the static or correlated mutual quiescence timers. The accumulated quiescence time is then used to determine when to invoke the BTZ process to re-center the spatial audio in the 3D virtual auditory space. The disturbance timer measures the duration of a temporary disturbance which is subtracted from the accumulated mutual quiescence time such that the onset of BTZ is not disturbed. The BTZ process can be adaptive in that different rates for removing tracking error can be used based on the size of the tracking error.

Example Software Hardware Architectures

Figure 10:
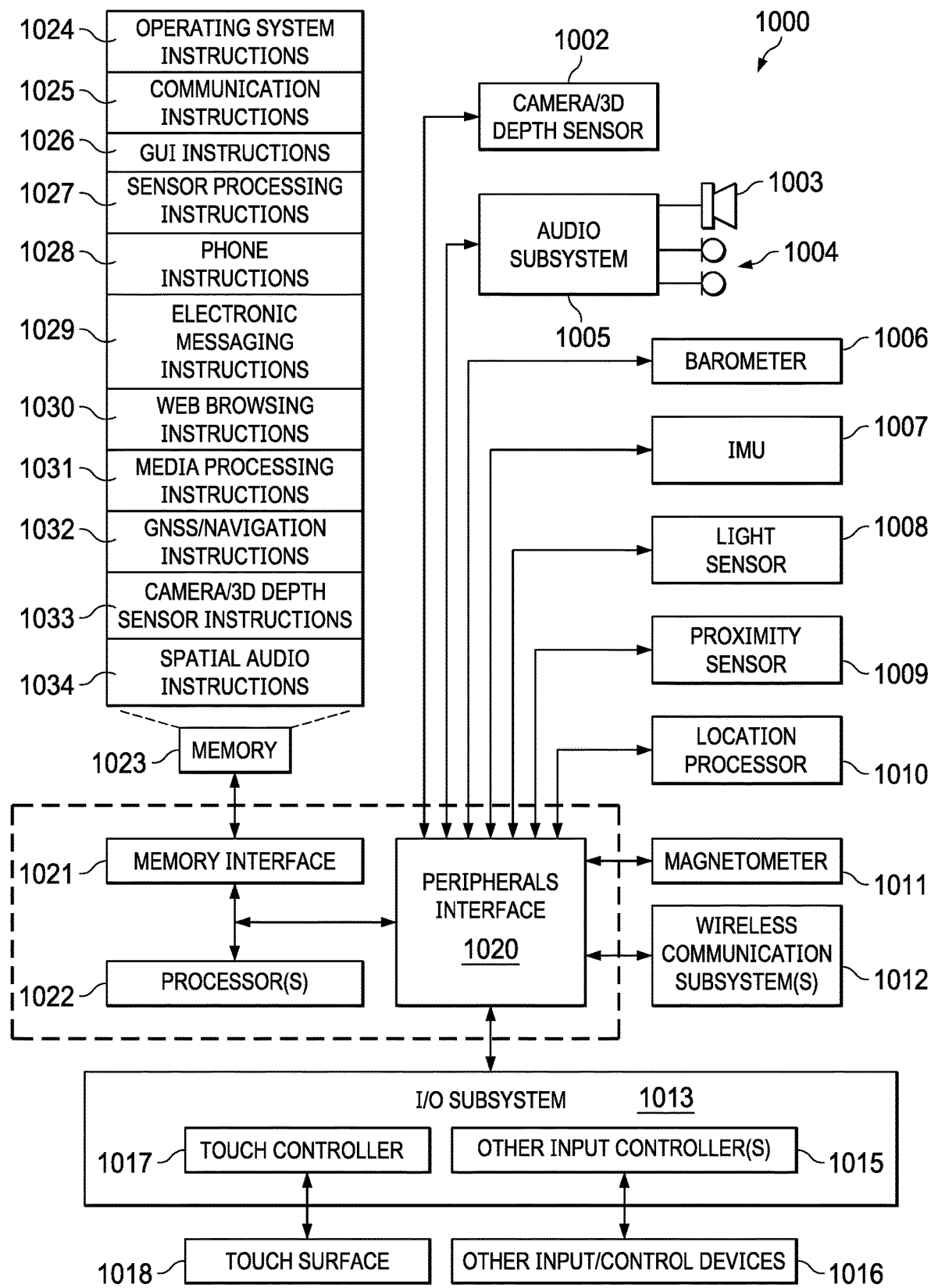
FIG. 10 a block diagram of source device architecture implementing the features and operations described in reference to FIGS. 1-9.

FIG. 10 is a conceptual block diagram of source device software/hardware architecture 1000 implementing the features and operations described in reference to FIGS. 1-9. Architecture 1000 can include memory interface 1021, one or more data processors, digital signal processors (DSPs), image processors and/or central processing units (CPUs) 1022 and peripherals interface 1020. Memory interface 1023, one or more processors 1022 and/or peripherals interface 1020 can be separate components or can be integrated in one or more integrated circuits.

Sensors, devices and subsystems can be coupled to peripherals interface 1020 to provide multiple functionalities. For example, IMU 1007, light sensor 1008 and proximity sensor 1009 can be coupled to peripherals interface 1020 to facilitate motion sensing (e.g., acceleration, rotation rates), lighting and proximity functions of the wearable computer. Location processor 1010 can be connected to peripherals interface 1020 to provide geo-positioning. In some implementations, location processor 1010 can be a GNSS receiver, such as the Global Positioning System (GPS) receiver. Electronic magnetometer 1011 (e.g., an integrated circuit chip) can also be connected to peripherals interface 1020 to provide data that can be used to determine the direction of magnetic North. Electronic magnetometer 1011 can provide data to an electronic compass application. IMU 1007 can be an IMU that includes one or more accelerometers and/or gyros (e.g., 3-axis MEMS accelerometer and 3-axis MEMS gyro) configured to determine change of speed and direction of movement of the source device. Barometer 1006 can be configured to measure atmospheric pressure around the mobile device.

Camera/3D depth sensor 1002 captures digital images and video and can include both front-facing and rear-facing cameras. The 3D depth sensor can be any sensor capable of capturing 3D data or point clouds, such as a time of flight (TOF) sensor or LiDAR.

Communication functions can be facilitated through wireless communication subsystems 1012, which can include radio frequency (RF) receivers and transmitters (or transceivers) and/or optical (e.g., infrared) receivers and transmitters. The specific design and implementation of the wireless communication subsystem 1024 can depend on the communication network(s) over which a mobile device is intended to operate. For example, architecture 1000 can include communication subsystems 1024 designed to operate over a GSM network, a GPRS network, an EDGE network, a Wi-Fi™ network and a Bluetooth™ network. In particular, the wireless communication subsystems 1024 can include hosting protocols, such that the mobile device can be configured as a base station for other wireless devices.

Audio subsystem 1005 can be coupled to a speaker 1003 and one or more microphones 1004 to facilitate voice-enabled functions, such as voice recognition, voice replication, digital recording and telephony functions. Audio subsystem 1005 can be configured to receive voice commands from the user.

I/O subsystem 1013 can include touch surface controller 1017 and/or other input controller(s) 1015. Touch surface controller 1017 can be coupled to a touch surface 1018. Touch surface 1018 and touch surface controller 1017 can, for example, detect contact and movement or break thereof using any of a plurality of touch sensitivity technologies, including but not limited to capacitive, resistive, infrared and surface acoustic wave technologies, as well as other proximity sensor arrays or other elements for determining one or more points of contact with touch surface 1046. Touch surface 1018 can include, for example, a touch screen or the digital crown of a smart watch. I/O subsystem 1013 can include a haptic engine or device for providing haptic feedback (e.g., vibration) in response to commands from processor or a digital signal processor (DSP) 1022. In an embodiment, touch surface 1018 can be a pressure-sensitive surface.

Other input controller(s) 1015 can be coupled to other input/control devices 1016, such as one or more buttons, rocker switches, thumb-wheel, infrared port and USB port. The one or more buttons (not shown) can include an up/down button for volume control of speaker 1003 and/or microphones 1004. Touch surface 1018 or other input control devices 1016 (e.g., a button) can include, or be coupled to, fingerprint identification circuitry for use with a fingerprint authentication application to authenticate a user based on their fingerprint(s).

In one implementation, a pressing of the button for a first duration may disengage a lock of the touch surface 1018; and a pressing of the button for a second duration that is longer than the first duration may turn power to the mobile device on or off. The user may be able to customize a functionality of one or more of the buttons. The touch surface 1018 can, for example, also be used to implement virtual or soft buttons.

In some implementations, the mobile device can present recorded audio and/or video files, such as MP3, AAC and MPEG files. In some implementations, the mobile device can include the functionality of an MP3 player. Other input/output and control devices can also be used.

Memory interface 1021 can be coupled to memory 1023. Memory 1023 can include high-speed random access memory and/or non-volatile memory, such as one or more magnetic disk storage devices, one or more optical storage devices and/or flash memory (e.g., NAND, NOR). Memory 1023 can store operating system 1024, such as the iOS operating system developed by Apple Inc. of Cupertino, California Operating system 1024 may include instructions for handling basic system services and for performing hardware dependent tasks. In some implementations, operating system 1024 can include a kernel (e.g., UNIX kernel).

Memory 1023 may also store communication instructions 1025 to facilitate communicating with one or more additional devices, one or more computers and/or one or more servers, such as, for example, instructions for implementing a software stack for wired or wireless communications with other devices. Memory 1023 may include graphical user interface instructions 1026 to facilitate graphic user interface processing; sensor processing instructions 1027 to facilitate sensor-related processing and functions; phone instructions 1028 to facilitate phone-related processes and functions; electronic messaging instructions 1029 to facilitate electronic-messaging related processes and functions; web browsing instructions 1030 to facilitate web browsing-related processes and functions; media processing instructions 1031 to facilitate media processing-related processes and functions; GNSS/Location instructions 1032 to facilitate generic GNSS and location-related processes; and camera/3D depth sensor instructions 1033 for capturing images (e.g., video, still images) and depth data (e.g., a point cloud). Memory 1023 further includes spatial audio instructions 1034 for use in spatial audio applications, including but not limited AR and immersive video applications. Instructions 1034 include head tracking instructions and implements the user pose change detection features and processes, described in reference to FIGS. 1-9.

Each of the above identified instructions and applications can correspond to a set of instructions for performing one or more functions described above. These instructions need not be implemented as separate software programs, procedures, or modules. Memory 1023 can include additional instructions or fewer instructions. Furthermore, various functions of the mobile device may be implemented in hardware and/or in software, including in one or more signal processing and/or application specific integrated circuits.

Figure 11:
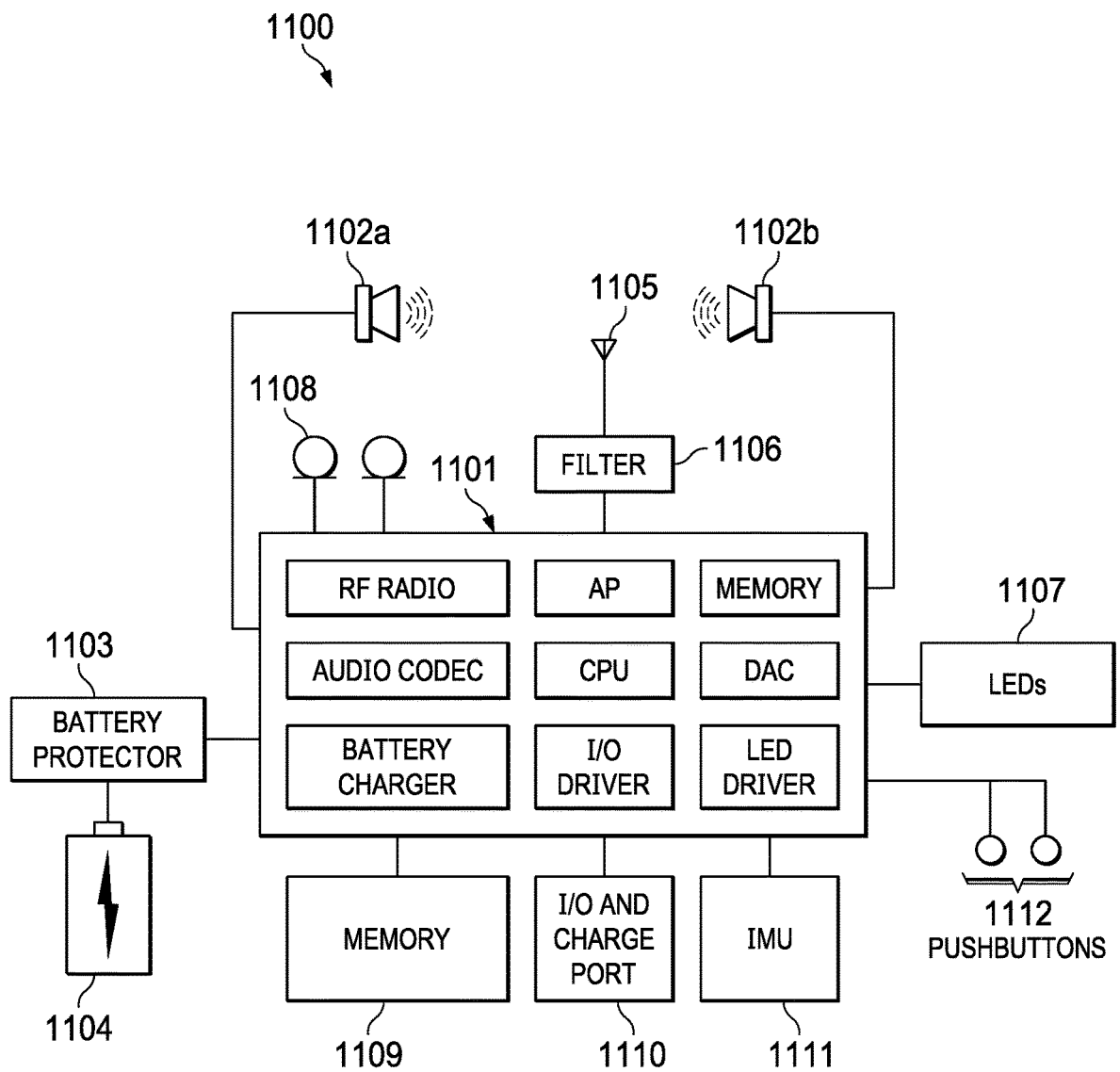
FIG. 11 a block diagram of headset architecture implementing the features and operations described in reference to FIGS. 1-9.

FIG. 11 is a conceptual block diagram of headset software/hardware architecture 1110 implementing the features and operations described in reference to FIGS. 1-9. In an embodiment, architecture 1100 can includes system-on-chip (SoC) 1101, stereo loudspeakers 1102a, 1102b (e.g., ear buds, headphones, earphones), battery protector 1103, rechargeable battery 1104, antenna 1105, filter 1106, LEDs 1107, microphones 1108, memory 1109 (e.g., flash memory), I/O/Charge port 1110, IMU 1111 and pushbuttons 1112 for turning the headset on and off, adjusting volume, muting, etc. IMU 1111 was previously described in reference to FIGS. 1-9, and includes, for example, a 3-axis MEMS gyro and a 3-axis MEMS accelerometer.

SoC 1101 further includes various modules, such as a radio frequency (RF) radio (wireless transceiver) for wireless bi-directional communication with other devices, such as a source device 102, as described in reference to FIGS. 1-9. SoC 1101 further includes an application processor (AP) for running specific applications, memory (e.g., flash memory), central processing unit (CPU) for managing various functions of the headsets, audio codec for encoding/decoding audio, battery charger for charging/recharging rechargeable battery 1104, I/O driver for driving I/O and charge port (e.g., a micro USB port), digital to analog converter (DAC) converting digital audio into analog audio and LED driver for driving LEDs 1107. Other embodiments can have more or fewer components.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., SWIFT, Objective-C, C#, Java), including compiled or interpreted languages, and it can be deployed in any form, including as a stand-alone program or as a module, component, subroutine, a browser-based web application, or other unit suitable for use in a computing environment.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As described above, some aspects of the subject matter of this specification include gathering and use of data available from various sources to improve services a mobile device can provide to a user. The present disclosure contemplates that in some instances, this gathered data may identify a particular location or an address based on device usage. Such personal information data can include location-based data, addresses, subscriber account identifiers, or other identifying information.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

In the case of advertisement delivery services, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

What is claimed is:

1. A method comprising:
   centering, using one or more processors, spatial audio in a three-dimensional (3D) virtual audio space;
   obtaining, using the one or more processors, first sensor data from an auxiliary device communicatively coupled to a source device, the source device configured to provide the spatial audio and the auxiliary device configured to playback the spatial audio in the 3D virtual audio space;
   obtaining, using the one or more processors, second sensor data from one or more motion sensors of the source device;
   determining, using the one or more processors, whether the source device and auxiliary device are in a period of mutual quiescence based on the first and second sensor data;
   in accordance with determining that the source device and the auxiliary device are in a period of mutual quiescence, re-centering the spatial audio in the 3D virtual auditory space following the period of mutual quiescence; and
   rendering, using the one or more processors, the re-centered spatial audio in the 3D virtual auditory space.

2. The method of claim 1, wherein the spatial audio is re-centered by zeroing out a correction angle at a rate determined by a size of the correction angle.

3. The method of claim 1, wherein the mutual quiescence is static mutual quiescence, where both the source device and the auxiliary device are static.

4. The method of claim 1, wherein the mutual quiescence is correlated mutual quiescence, where the first sensor data and the second sensor data are correlated.

5. The method of claim 1, wherein the spatial audio is re-centered when the period of mutual quiescence exceeds a threshold time.

6. The method of claim 5, further comprising:
   during the period of mutual quiescence:
   accumulating, using a first timer, a mutual quiescence time;
   detecting, using the one or more processors, a disturbance based on the first sensor data or the second sensor data;
   responsive to the detection, accumulating, using a second timer, a disturbance time;
   determining, using the one or more processors, that the disturbance has ended based on the first sensor data or the second sensor data;
   subtracting, using the one or more processors, the disturbance time from the mutual quiescence time;
   resuming, using the one or more processors, accumulating the mutual quiescence time;
   determining, using the one or more processors, whether the mutual quiescence time exceeds the threshold time; and
   in accordance with the mutual quiescence time exceeding the threshold time, re-centering the spatial audio in the 3D virtual auditory space.

7. The method of claim 6, further comprising:
   during the disturbance, incrementing the second timer and decrementing the first timer; and
   after the disturbance has ended, decrementing the second time and incrementing the first timer.

8. The method of claim 6, wherein the first sensor data and the second sensor data include acceleration data and rotation rate data, and detecting a disturbance based on the first sensor data or the second sensor data, further comprises:
   determining whether a source device maximum, low-pass filtered, acceleration data or an auxiliary device maximum, low-pass filtered, acceleration data meets a first threshold;
   determining whether a source device maximum acceleration data or an auxiliary device maximum acceleration data meets a second threshold;
   determining whether a source device maximum rotation rate or an auxiliary device maximum rotation rate meets a third threshold;
   determining whether a source device maximum average rotation rate or an auxiliary device maximum average rotation rate meets a fourth threshold; and
   in accordance with the first, second, third and fourth thresholds being met,
   determining that a disturbance is detected.

9. The method of claim 1, further comprising:
   during the period of mutual quiescence:
   accumulating, using a first timer, a first mutual quiescence time;
   detecting a disturbance based on the first sensor data or the second sensor data;
   responsive to the detection, accumulating, using a second timer, a disturbance time;
   determining that disturbance time has exceeded a threshold time; and
   resetting the first timer and the second timer to zero.

10. The method of claim 6, further comprising:
    during the period of mutual quiescence:
    determining that a visual anchor was used to re-center the spatial audio; and
    resetting the mutual quiescence time to zero.

11. A system comprising:
    one or more processors;
    memory storing instructions that when executed by the one or more processors cause the one or more processors to perform operations comprising:

centering spatial audio in a three-dimensional (3D) virtual audio space;
obtaining first sensor data from an auxiliary device communicatively coupled to a source device, the source device configured to provide the spatial audio content and the auxiliary device configured to playback the spatial audio in the 3D virtual audio space;
obtaining second sensor data from one or more motion sensors of the source device;
determining whether the source device and auxiliary device are in a period of mutual quiescence based on the first and second sensor data;
in accordance with determining that the source device and the auxiliary device are in a period of mutual quiescence, re-centering the spatial audio in the 3D virtual auditory space following the period of mutual quiescence; and
rendering the re-centered spatial audio in the 3D virtual auditory space.

12. The system of claim 11, wherein the spatial audio is re-centered by zeroing out a correction angle at a rate determined by a size of the correction angle.

13. The system of claim 11, wherein the mutual quiescence is static mutual quiescence, where both the source device and the auxiliary device are static.

14. The system of claim 11, wherein the mutual quiescence is correlated mutual quiescence, where the first sensor and the second sensor are correlated.

15. The system of claim 11, wherein the spatial audio is re-centered when the period of mutual quiescence exceeds a threshold time.

16. The system of claim 15, the operations further comprising:
during the period of mutual quiescence:
accumulating, using a first timer, a mutual quiescence time;
detecting a disturbance based on the first sensor data or the second sensor data;
responsive to the detection, accumulating, using a second timer, a disturbance time;
determining that the disturbance has ended based on the first sensor data or the second sensor data;
subtracting the disturbance time from the mutual quiescence time;
resuming accumulating the mutual quiescence time;
determining whether the mutual quiescence time exceeds the threshold time; and
in accordance with the mutual quiescence time exceeding the threshold time, re-centering the spatial audio in the 3D virtual auditory space.

17. The system of claim 16, the operations further comprising:
during the disturbance, incrementing the second timer and decrementing the first timer; and
after the disturbance has ended, decrementing the second time and incrementing the first timer.

18. The system of claim 16, wherein the first sensor data and the second sensor data include acceleration data and rotation rate data, and detecting a disturbance based on the first sensor data or the second sensor data, further comprises:
determining whether a source device maximum, low-pass filtered, acceleration data or an auxiliary device maximum, low-pass filtered, acceleration data meets a first threshold;
determining whether a source device maximum acceleration data or an auxiliary device maximum acceleration data meets a second threshold;
determining whether a source device maximum rotation rate or an auxiliary device maximum rotation rate meets a third threshold;
determining whether a source device maximum average rotation rate or an auxiliary device maximum average rotation rate meets a fourth threshold; and
in accordance with the first, second, third and fourth thresholds being met,
determining that a disturbance is detected.

19. The system of claim 11, the operations further comprising:
during the period of mutual quiescence:
accumulating, using a first timer, a first mutual quiescence time;
detecting a disturbance based on the first sensor data or the second sensor data;
responsive to the detection, accumulating, using a second timer, a disturbance time;
determining that disturbance time has exceeded a threshold time; and
resetting the first timer and the second timer to zero.

20. The system of claim 16, the operations further comprising:
during the period of mutual quiescence:
determining that a visual anchor was used to re-center the spatial audio; and
resetting the mutual quiescence time to zero.

* * * * *

UNITED STATES PATENT AND TRADEMARK OFFICE
CERTIFICATE OF CORRECTION

PATENT NO. : 12,219,344 B2
APPLICATION NO. : 17/485052
DATED : February 4, 2025
INVENTOR(S) : Xiaoyuan Tu and Alexander Singh Alvarado Page 1 of 1

It is certified that error appears in the above-identified patent and that said Letters Patent is hereby corrected as shown below:

In the Claims

Column 16, Line 26, In Claim 7, delete "time" and insert --timer--;

Column 17, Line 6, In Claim 11, before "and" delete "content";

Column 18, Line 9, In Claim 17, delete "time" and insert --timer--.

Signed and Sealed this
First Day of April, 2025

Coke Morgan Stewart
*Acting Director of the United States Patent and Trademark Office*